US012701482B2

(12) United States Patent
Whitley et al.

(10) Patent No.: US 12,701,482 B2
(45) Date of Patent: Aug. 4, 2026

(54) SWITCHING CELLS BASED ON MONITORING PERFORMANCE MANAGEMENT MESSAGES

(71) Applicant: Boost SubscriberCo L.L.C., Englewood, CO (US)

(72) Inventors: Samuel Jon Whitley, Cheyenne, WY (US); Ryan Richard Carey, Denver, CO (US); Brian Howard Williams, Cheyenne, WY (US); Vineet Tyagi, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 696 days.

(21) Appl. No.: 18/092,009

(22) Filed: Dec. 30, 2022

(65) Prior Publication Data

US 2024/0224149 A1 Jul. 4, 2024

(51) Int. Cl.
H04W 36/30 (2009.01)
H04W 36/32 (2009.01)

(52) U.S. Cl.
CPC ........... H04W 36/30 (2013.01); H04W 36/32 (2013.01)

(58) Field of Classification Search
None
See application file for complete search history.

(56) References Cited

U.S. PATENT DOCUMENTS

| | | | |
|---|---|---|---|
| 7,421,478 B1 | 9/2008 | Muchow et al. | |
| 9,220,125 B2 | 12/2015 | Dai et al. | |
| 9,246,785 B2 | 1/2016 | Ralph et al. | |
| 10,154,106 B2 | 12/2018 | Zhang et al. | |
| 10,243,704 B2 | 3/2019 | Yiu et al. | |
| 10,897,732 B2 | 1/2021 | Sirotkin et al. | |
| 2009/0110158 A1* | 4/2009 | Chen | H04L 67/04 |
| | | | 704/E15.044 |
| 2018/0279404 A1 | 9/2018 | Mishra et al. | |
| 2020/0351729 A1* | 11/2020 | Rastegardoost | H04W 36/0072 |
| 2021/0195475 A1* | 6/2021 | Youtz | H04W 36/0058 |
| 2023/0361977 A1* | 11/2023 | Shvodian | H04W 72/0457 |

FOREIGN PATENT DOCUMENTS

EP 3588862 B1 1/2021

* cited by examiner

*Primary Examiner* — Charles N Appiah
*Assistant Examiner* — Frank E Donado
(74) *Attorney, Agent, or Firm* — Lowenstein Sandler LLP

(57) ABSTRACT

Methods, systems, and apparatus, including computer programs encoded on a computer storage medium for switching cells based on monitoring performance management messages. A network administration module can identify that a user equipment (UE) is associated with a first transceiver in a first cell area. The network administration module can determine that a first periodic message indicative of bandwidth availability within the first cell area has not been received for a threshold amount of time and that the first transceiver is incapable of providing connectivity to the UE. The network administration module can determine that the UE is within a second cell area and that a second transceiver associated with the second cell area is capable of providing connectivity to the UE, and can provide instructions to the UE to initiate a connection with the second transceiver.

20 Claims, 3 Drawing Sheets

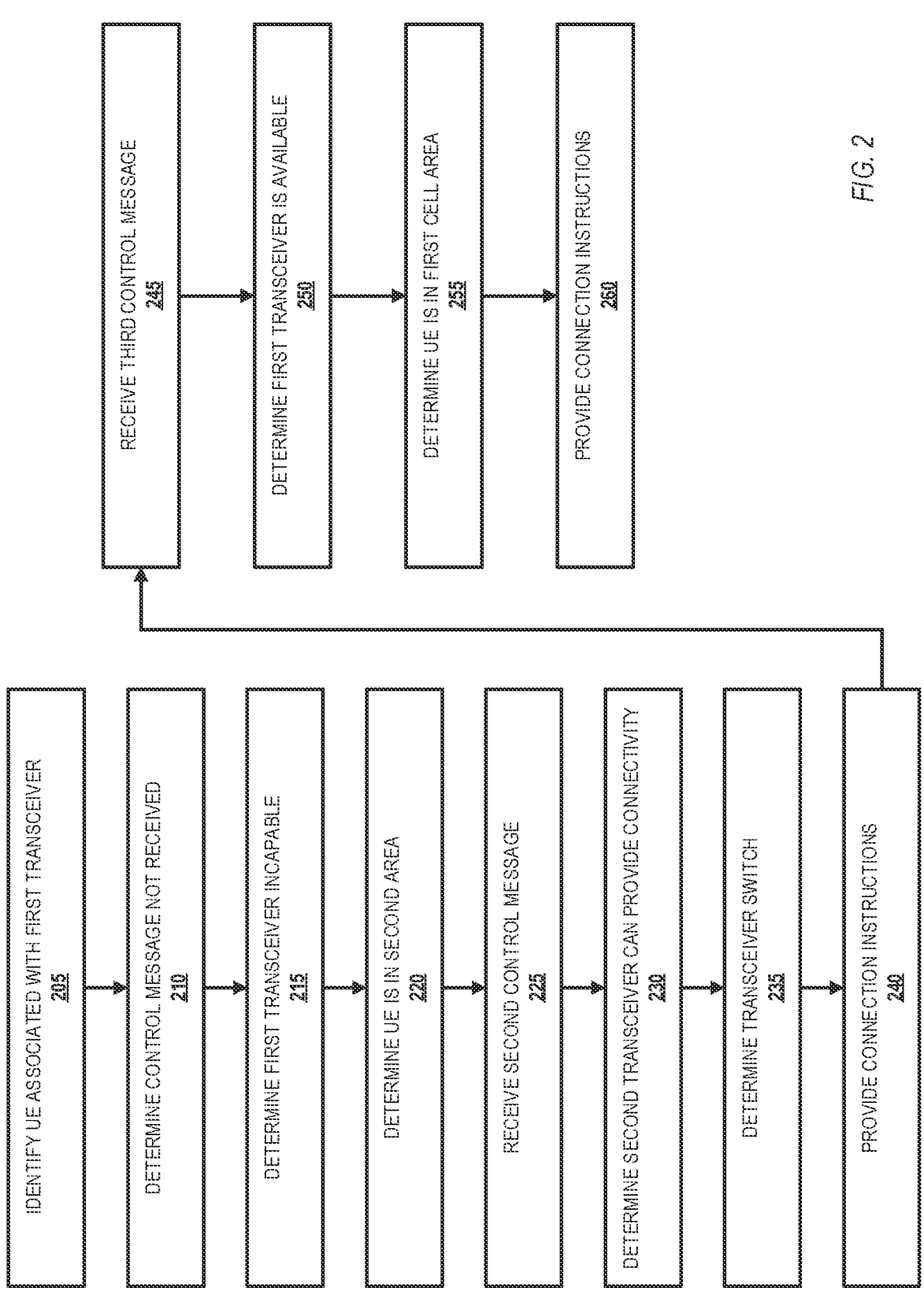

IDENTIFY UE ASSOCIATED WITH FIRST TRANSCEIVER
205

DETERMINE CONTROL MESSAGE NOT RECEIVED
210

DETERMINE FIRST TRANSCEIVER INCAPABLE
215

DETERMINE UE IS IN SECOND AREA
220

RECEIVE SECOND CONTROL MESSAGE
225

DETERMINE SECOND TRANSCEIVER CAN PROVIDE CONNECTIVITY
230

DETERMINE TRANSCEIVER SWITCH
235

PROVIDE CONNECTION INSTRUCTIONS
240

RECEIVE THIRD CONTROL MESSAGE
245

DETERMINE FIRST TRANSCEIVER IS AVAILABLE
250

DETERMINE UE IS IN FIRST CELL AREA
255

PROVIDE CONNECTION INSTRUCTIONS
260

FIG. 2

SWITCHING CELLS BASED ON MONITORING PERFORMANCE MANAGEMENT MESSAGES

TECHNICAL FIELD

This specification relates to failure recovery for wireless networks.

BACKGROUND

Wireless networks provide data connectivity among computing devices, which can include laptop computers, desktop computers, cellular telephones, and tablets, among other devices.

SUMMARY

This specification describes technologies for switching cells of a wireless network based on monitoring, at a network administration device or module, periodic performance management messages transmitted by the cells. For example, a distribution unit (DU) in a 5G wireless network transmits periodic messages indicating bandwidth availability for each of multiple frequency bands serviced by the cell. If none of the periodic messages are received from a particular cell, a determination may be made that all frequency bands of the particular cell are unavailable, and consequently the cell is incapable of providing wireless connectivity to a user equipment (UE). In response to such a determination, the network administration device can instruct UEs connected to that particular cell to switch to another cell that has bandwidth available to provide connectivity. These technologies generally involve providing continuity of wireless service by determining that a cell site is unable to provide wireless networking services to the UE and switching the UE to an alternate cell site without the need to process separate messages indicative of whether particular cells are down (often referred to as "heartbeat" messages).

In one aspect, this document features a method that includes identifying, at a network administration module, that a user equipment (UE) is associated with a first transceiver in a first cell area. The network administration module can determine that a first periodic message indicative of bandwidth availability within the first cell area has not been received for a threshold amount of time and that the first transceiver is incapable of providing connectivity to the UE. The network administration module can determine that the UE is within a second cell area, determine that a second transceiver associated with the second cell area is capable of providing connectivity to the UE and provide instructions to the UE to initiate a connection with the second transceiver.

In a second aspect, this document features a system that includes one or more computing devices and one or more storage devices connected to communicate with the one or more computing devices. The one or more storage devices can store instructions, that when executed by the one or more computing devices, cause the system to perform operations. The operations can include identifying, at a network administration module implemented using the one or more computing devices, that a user equipment (UE) is associated with a first transceiver in a first cell area. The network administration module can determine that a first periodic message indicative of bandwidth availability within the first cell area has not been received for a threshold amount of time and that the first transceiver is incapable of providing connectivity to the UE. The network administration module can determine that the UE is within a second cell area, determine that a second transceiver associated with the second cell area is capable of providing connectivity to the UE, and provide instructions to the UE to initiate a connection with the second transceiver.

In a third aspect, this document features one or more non-transitory computer-readable storage media storing instructions that when executed by one or more computers, cause the one or more computers to perform operations that include identifying, at a network administration module, that a user equipment (UE) is associated with a first transceiver in a first cell area. The network administration module can determine that a first periodic message indicative of bandwidth availability within the first cell area has not been received for a threshold amount of time and that the first transceiver is incapable of providing connectivity to the UE. The network administration module can determine that the UE is within a second cell area, determine that a second transceiver associated with the second cell area is capable of providing connectivity to the UE and provide instructions to the UE to initiate a connection with the second transceiver. Implementations of the above aspects can include one or more of the following features.

The network administration module can receive a second periodic message indicative of bandwidth availability within the second cell area. Responsive to receiving the second periodic message indicative of the bandwidth availability within the second cell area, the network administration module can determine that the UE is to be switched from the connection with the first transceiver to the connection with the second transceiver. Determining that the UE is to be switched from the connection with the first transceiver to the connection with the second transceiver further can include determining that the second periodic message has been received within a threshold amount of time. The network administration module can receive a third periodic message indicative of bandwidth availability within the first cell area, and the third periodic message can indicate that the first transceiver is available to provide connectivity. The network administration module can determine that the UE is located within the first cell area. In response to determining that the UE is within the first cell area, the network administration module can provide instructions to the UE to connect to the first transceiver. The first transceiver can be a portion of a radio access network (RAN) associated with a first wireless carrier, and the second transceiver can be a portion of a RAN associated with a second wireless carrier. The first transceiver and the second transceiver can be portions of a radio access network (RAN) associated with a particular wireless carrier. The first cell area and the second cell area can be partially overlapping, and the UE can be located in the overlapping area.

The subject matter described in this specification as implemented in particular embodiments can provide one or more of the following advantages. In general, the techniques described in this specification can be used to provide continuity of wireless network service to UEs even when a particular cell site becomes inoperative without the need to process dedicated messages indicative of cell health. For example, by deducing cell health from one or more control messages (e.g., performance management messages such as bandwidth counter messages indicative of whether a particular frequency band of a cell is available) that routinely flow over the network, the techniques described herein can be used to reduce the amount of data required to determine whether a particular cell site is operational. In addition, by coordinating the switching of cells from a network administration device or module, switching decisions can be outsourced from resource-constrained environments of UEs to a network device, thereby enabling potentially faster processing and avoiding redundancy associated with the decision being made at individual UEs. The centralized decision to switch all UEs of an inoperative cell to a functional one (potentially that of a roaming partner) may result in an improved user experience for the users of the UEs. In some cases, UEs associated with an inoperative cell can be switched to a cell of one of multiple roaming partners, thereby offering additional flexibility and choice regarding a quality of service.

Further, by detecting that a cell site is down, the techniques can be used to reduce the number of undeliverable messages sent by UEs, thereby reducing the use of energy and computing resources (e.g., CPU and radio) by the UEs. The techniques can additionally be used to predict cell site outages, which can enable recovery before failure, further improving the use of network and computing resources, including power consumption.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for switching cells based on monitoring performance management messages.

Like reference numbers and designations in the various drawings indicate like elements.

DETAILED DESCRIPTION

Wireless networks provide connectivity to billions of devices worldwide. Cell sites contain powerful radios that can exchange data with wireless devices (also referred to as "user equipment" (UE)) such as cellular telephones within a particular geographical area, enabling such devices to remain network connected across large segments of the planet. The particular geographical area serviced by a cell site is often referred to simply as a "cell." Large numbers of overlapping and/or non-overlapping cells together provide wireless connectivity to UEs over extended geographic regions.

Cell sites can become inoperative—i.e., unable to provide connectivity to UEs—for various reasons such as excessive network use by devices in the region serviced by the cell site, equipment failure, etc. In such cases, UEs are switched to alternate cell sites (e.g., one that is associated with an overlapping cell of the same wireless carrier, or a cell site of a roaming partner) to provide uninterrupted service.

Identifying whether a cell is operational and deciding whether to switch to another cell are typically performed by the UE, e.g., based on polling the cell sites or particular transceivers of the cell sites. In some cases, dedicated messages that are periodically transmitted (also referred to as "heartbeat" messages) can be monitored to detect whether a particular cell site is operational. Such detection techniques can require additional status messages to be exchanged over the network, which in turn can consume power, network bandwidth and processing capacity of the devices. In particular, when executed at the UE, such monitoring can challenge the resource-constrained platforms of the devices.

The technology described herein can provide various improvements, including in the following ways. First, the monitoring of cell health is carried out at a network device or module, which not only alleviates the challenges associated with executing the operations within the resource-constrained environments of UEs, but also provides for a potentially improved user experience by centralizing the decision to switch all UEs connected to an inoperative cell site over to a cell site that is operational. In addition, by removing the redundancy of monitoring at individual UEs, significant overall energy savings may be achieved. Further, by deducing cell health from one or more performance management messages that are exchanged over the network during regular operations, the technology described herein avoids the need for exchanging dedicated messages. This in turn can achieve savings in available bandwidth, processing power, and energy.

Figure 1:
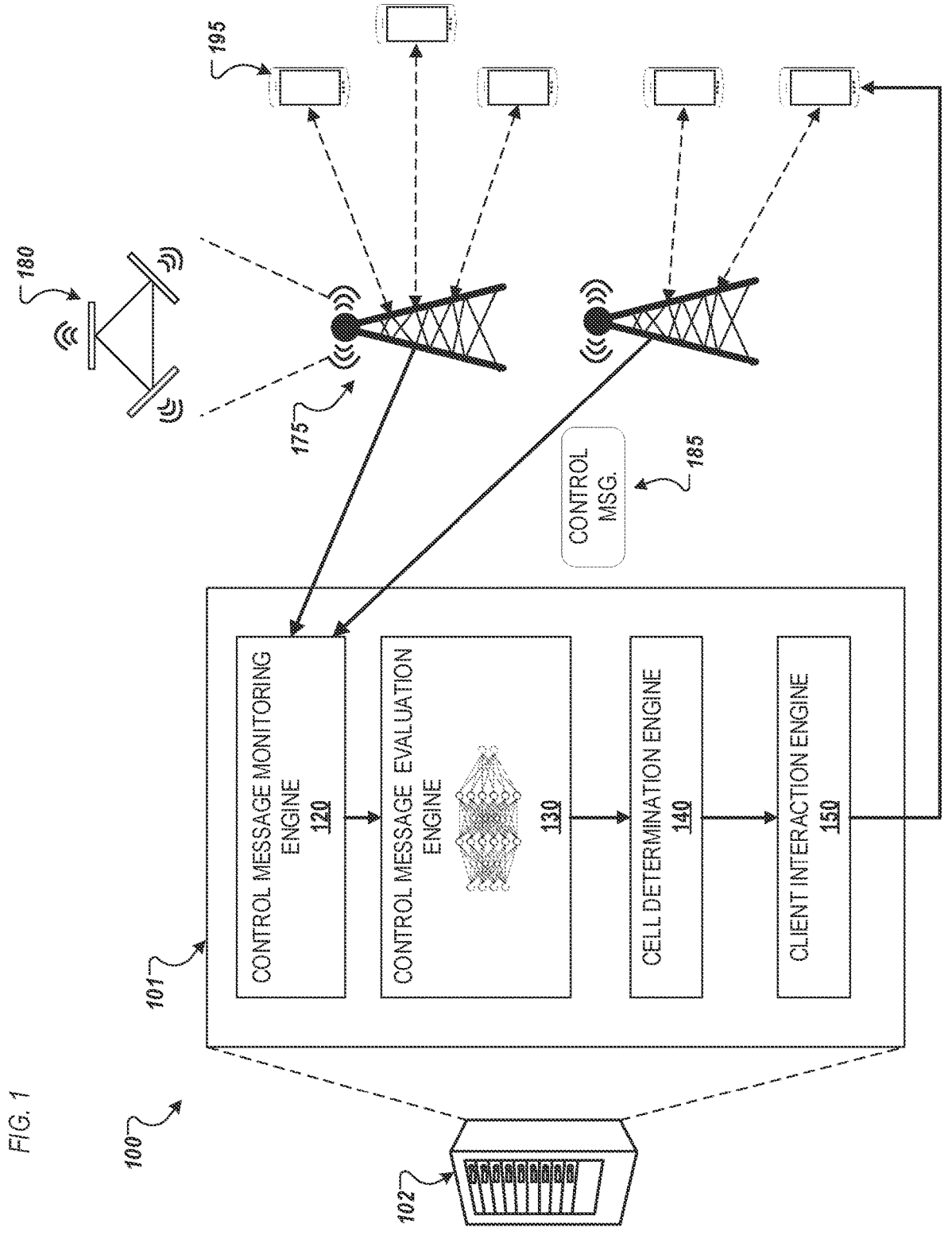
FIG. 1 shows an example environment for switching cells based on monitoring performance management messages.

FIG. 1 shows an example environment 100 for switching cells based on monitoring performance management messages. The environment 100 can include a network administration module 101, cell sites 175 and user equipment (UE) 195.

In general, the network administration module 101 can receive control messages 185, such as performance management messages, that are transmitted during typical operations of cell sites 175. The network administration module 101 can determine from the control messages 185 whether the cell site 175 is capable of providing connectivity to UE 195. For example, if the network administration module 101 does not receive a control message 185 from a cell site 175 within a configured time period, the network administration module 101 can determine that the cell site 175 is not capable of providing connectivity. In another example, the control messages 185 might specify both a cell site 175 and a particular frequency band, and if such control messages 185 are not received within a configured period of time for any frequency band provided by a cell site 175, the network administration module 101 can determine that the cell site 175 is not capable of providing connectivity.

When the network administration module 101 determines that a cell site 175 is not capable of providing connectivity to UE 195, the network administration module 101 can instruct the UE 195 to switch to an alternate cell site 175. For example, the network administration module 101 can determine from the location of the UE 195 another cell site 175 capable of providing connectivity at the location.

UE 195 can include electronic devices such as mobile devices (described further in reference to FIG. 3) that are capable of coupling to and communicating over networks, including wireless networks. In some implementations, the UEs are configured to connect to one of multiple wireless networks each provided by a corresponding wireless carrier or vendor. Examples of UE 195 include mobile communication devices, e.g., smartphones and/or tablet computers, and other devices that can send and receive data over the network. UE 195 can also include a digital media device, a gaming system, or a virtual reality system.

UE 195 can include applications such as web browsers and/or native applications, to facilitate the sending and receiving of data over a network. A native application is an application developed for a particular platform or a particular device (e.g., mobile devices having a particular operating system). Although operations may be described as being performed by UE 195, such operations may be performed by an application running on UE 195.

A cell site 175 is a device or collection of devices capable of creating a network coupling to one or more instances of UE 195. A cell site 175 (sometimes called a "cell tower") can include one or more transceivers 180 that can each include one or more antennas capable of transmitting and receiving wireless networking signals to UE 195 within a particular region or "cell" or "cell area," to other cell sites 175, and to the network administration module 101. In some implementations, a cell site 175 can also communicate with other transceivers 180 and with the network administration module 101 using one or more wired networks.

A cell site 175 can be part of a radio access network (RAN) provided by one or more wireless carriers. An entire cell site 175 can belong to a particular wireless carrier and/or subsets of the transceivers 180 at the cell site 175 can belong to different wireless carriers.

The antennas for a transceiver 180 can be mounted on a structure such as a tower to enable communication over a larger area than could be achieved if the antennas were mounted at ground level. The antennas can further be mounted at angles, so the signals from one antenna are less likely to interfere with the signals of another antenna. For example, three transceivers 180 at a cell site 175 can each have an antenna mounted at 120-degree angular intervals so that the antennas collectively approximately cover a circular (i.e., 360-degree) area.

A cell site 175 can be configured for a specific channel, which can be a collection of frequencies used by a transceiver 180, and a transceiver 180 can be defined by its channel, frequency and other descriptive information (e.g., a unique identifier, geographic location information, etc.). Cell sites 175 that transmit signals over adjoining areas can be configured such that they contain transceivers 180 with no overlapping frequencies.

In some implementations, the network administration module 101 can be included in a network computing device 102. The network computing device 102 can be, for example, a server, or a portion of a distributed system administering a cloud environment. The network administration module 101 can be implemented as a software module executing on the network computing device 102 or as a combination of software and hardware modules. In some implementations, the network administration module 101 can be configured to receive various messages (e.g., performance management messages) that are exchanged over the network and to transmit and receive other messages to and from cell sites 175 and transceivers 180. The network administration module 101 can use the control messages 185 to determine whether a particular transceiver 180 is capable of providing connectivity to UE 195 and, in some implementations, can use the control messages 185 to predict whether a transceiver 180 will continue to be capable of providing connectivity to UE 195. A transceiver 180 may be unable to provide connectivity to UE 195, for example, when the bandwidth demand at the transceiver 180 is unusually high.

The network administration module 101, which, in some implementations, can be a component of a system that performs monitoring and/or management functions of cell sites 175 and transceivers 180, can include a control message monitoring engine 120, a control message evaluation engine 130, a cell determination engine 140, and a client interaction engine 150. The network administration module

101 can also include or be coupled to a repository that includes information describing the locations of cell sites 175 and transceivers 180. The repository can also store transceiver 180 performance information, for example, latency and throughput between transceivers 180 and UE 195 at one or more locations. In addition, the repository can include information relating to the network providers that own or manage transceivers 180.

The control message monitoring engine 120 can receive control messages 185 from cell sites 175 and transceivers 180 using various techniques. For example, the control message monitoring engine 120 can receive control messages 185 over a network. In another example, the control message monitoring engine 120 can include an Application Programming Interface (API), which, when called by a cell site 175 or transceiver 180, enables the cell site 175 or transceiver 180 to pass control messages 185.

The control message evaluation engine 130 can be configured to deduce, from the control messages 185, whether a transceiver 180 can provide connectivity to UE 195. The control message evaluation engine 130 can deliver to the cell determination engine 140 an indication as to whether a transceiver 180 or cell site 175 can provide connectivity to the UE 195 and/or is predicted to be able to provide connectivity to the UE 195 at a future time period. A transceiver 180 that is not capable of providing connectivity to the UE 195 and/or is predicted not to be able to provide connectivity to UE 195 at a future time can be called a faulty transceiver 180.

The control message evaluation engine 130 can use the control messages 185 to evaluate criteria. Criteria can be expressed in various forms. For example, criteria can be expressed as rules that include conditions and results such that, when a condition is satisfied, the rule produces a result. The control message evaluation engine 130 can evaluate the conditions and determine results, including results indicating that a transceiver 180 is capable or incapable of providing connectivity to UE 195. In one example, if a control message 185 is not received within a configured period, the cell site 175 can be determined not to be able to provide connectivity to UE 195.

In some implementations, the control message evaluation engine 130 can include a machine learning model, such as a deep neural network (DNN), that is configured to produce results that can include indications that a transceiver 180 is capable or incapable of providing connectivity to UE 195. The machine learning model can also be configured to produce a result that indicates whether a transceiver 180 is predicted to be capable of providing connectivity to UE 195 at one or more future times (e.g., 15 seconds, 30 seconds, 1 minute, 5 minutes, etc.). The control message evaluation engine 130 can process an input that includes one or more control messages 185 using the machine learning model to produce one or more results.

The cell determination engine 140 can receive from the control message evaluation engine 130 an indication that a transceiver 180 or cell site 175 is not capable of providing connectivity to UE 195, or is predicted not to be able to provide connectivity to UE 195. In response, the cell determination engine 140 can determine the nearest cell for use by UE 195 instead of the faulty transceiver 180. For example, the cell determination engine 140 can consult a repository that includes the locations of cells and use the location information to find the closest cell. In another example, the cell determination engine 140 can consult a repository and select the transceiver 180 with preferred performance characteristics (e.g., highest bandwidth). The cell determination engine 140 can provide the selected cell and an indication of the faulty transceiver 180 to the client interaction engine 150.

The client interaction engine 150 can provide, to UE 195 associated with a connection to the faulty cell, an indication of the selected cell site 175. The client interaction engine 150 can maintain a list of transceivers 180 and, for each transceiver 180, a list of UEs 195 coupled to the transceiver 180. The client interaction engine 150 can, for each UE 195 coupled to the cell, provide an indication that the UE 195 should couple to the selected transceiver 180.

In some implementations, a control message 185 can include a descriptor of the UE 195 sending the control message 185, the transceiver 180 and/or cells to which the control message 185 applies, and a timestamp indicating when the control message 185 was sent, among other information. Examples of control messages include performance management messages, e.g., messages from cell bandwidth counters indicative of bandwidth availability and exchanged between the network administration module 101 and cell sites 175 and transceivers 180. In some implementations, receipt of any control message, or a specified subset of control messages, from a cell site 175 can be considered a control message 185, as such messages can indicate proper operation.

FIG. 2 is a flow diagram of an example process 200 for switching cells based on monitoring performance management messages. The process 200 can be performed, for example, by a system of one or more computers located at one or more locations and programmed appropriately in accordance with this specification. For example, a system for switching cells based on monitoring, e.g., the network administration module 101 of FIG. 1, which can be implemented in an appropriately programmed network administration device, can be configured to perform the process 200.

The system can identify (205), at a network administration device, that a user equipment (UE) is associated with a first transceiver. In some implementations, the system can have received a message from the UE and/or from the transceiver indicating an association between the UE and the first transceiver. For example, when the UE enters the cell for which the first transceiver is providing service, the UE can associate with the first transceiver. In response, the UE and/or the first transceiver can provide a message to the system indicating the association.

In some implementations, the system can determine that the UE is associated with a first transceiver if the UE is located within a first cell area for which the first transceiver is configured to provide connectivity. To identify that the UE is located within the first cell area, the system can receive status messages from the UE that can include position indicators and/or control messages. For example, a position message can include the position of the UE, indicators of one or more cell sites from which the UE is receiving wireless signals, and/or other position indicators, such as Global Positioning Satellite (GPS) coordinates. The system can receive the messages directly from the UE or indirectly through other equipment, such as a cell site.

The system can determine (210) that a control message, such as a performance management message, has not been received. In one example, the control message can be an indication of bandwidth available at the first transceiver used by the system to monitor bandwidth availability throughout the system. Thus, the system does not require a separate message to determine transceiver availability.

In some implementations, at a first time, the system can receive from the transceiver, or from the cell site at which the transceiver is located, a first control message, which the system can interpret to indicate that the first transceiver is capable of providing connectivity to the UE. Upon receipt of the first control message, the system can then set a timer, and if the timer expires before receipt of a second control message from the transceiver, the system can determine that the control message has not been received. If a second control message is received, the system can reset the timer and determine whether a third control message arrives before the timer expires, and the process can continue repeatedly. The timer can be set to any appropriate value such as 30 seconds, 60 seconds, 2 minutes, 5 minutes, and so on.

The system can use various techniques to determine (215) that the transceiver is incapable of providing connectivity to the UE. In some implementations, the system can determine that the first transceiver is incapable of providing connectivity to the UE if the system determines that the control message has not been received, as described in reference to operation 210. For example, the system can receive cell bandwidth counters for a transceiver, where each cell bandwidth counter includes the available cell bandwidth for a frequency, or multiple frequencies, of the transceiver. If the system does not receive a cell bandwidth counter for any frequency of the transceiver, the system can determine that the transceiver is incapable of providing connectivity to the UE.

In some implementations, the system can include a machine learning model, such as a deep neural network (DNN), that is configured to produce results that can include indications that a transceiver is capable or incapable of providing connectivity to UE 195. The system can process an input that includes received control messages (e.g., bandwidth messages or other control messages) using the machine learning model, and the machine learning model can produce an output that indicates whether the transceiver is capable of providing connectivity to UE 195 and/or is predicted to be capable of providing connectivity over some future period of time. The input can include the time of receipt of a configured number of control messages (e.g., 5, 10, 20, etc.). The input can further include other indicators that can be relevant to potential failure of a cell site, which can include weather (temperature, wind, precipitation, ice, etc.), maintenance (scheduled, in progress, and completed), age of one or more cell site components, percentage of bandwidth consumed at the cell site (current and/or historical), among many other examples.

The system can determine (220) that the UE is within a second cell area. To determine that the UE is within the second cell area, as described above, the system can receive status messages from the UE that can include position indicators, and the system can determine whether the position indicator is within the second cell area. In some implementations, the UE can provide a message to a second transceiver that is providing connectivity in the second cell area, and the second transceiver can provide to the system an indication that the UE is in the second cell area.

In some cases, the second cell area can overlap with the first cell area. Such overlap can depend on the location of the cell sites, the power of the transmitter, the topography and other factors, and transceivers can be configured to provide overlapping coverage, e.g., using different frequencies. In some cases, the UE can be mobile and can have entered the second cell area before the system determines that the first transceiver is incapable of providing connectivity, while the system is making that determination, or after the system has made the determination. Therefore, while the first cell area and the second cell area can overlap, overlap is not required.

The system can receive (225) a second control message and determine (230) that a second transceiver is available to support connectivity to the UE in the second cell area. The system can receive the second control message from the second transceiver, e.g., when the second transceiver provides a bandwidth counter message or other control message.

Similar to the techniques described above, upon receipt of a first control message, the system can set a timer, and if the timer does not expire before receipt of a second control message from the second transceiver, the system can determine that the second transceiver is available to support connectivity to the UE in the second cell area.

The system can determine (235) that the UE is to be switched from a connection with the first transceiver to a connection with the second transceiver. In some implementations, the system can determine that a switch should be made when the first transceiver is not capable of providing connectivity. In some implementations, the system can determine that a switch should be made when the system predicts that the first transceiver will not be capable of providing connectivity.

In response to determining that the UE is to be switched to the connection with the second transceiver, the system can provide (240) to the UE, instructions to initiate a connection with the second transceiver. The system can transmit a message to the UE that includes a descriptor for the second transceiver, indicating to the UE that it should use the second transceiver. If the first transceiver and the second transceiver are portions of a radio access network (RAN) associated with one particular wireless carrier, no operations relating to switching carriers are necessary.

If the first transceiver is a portion of a radio access network (RAN) associated with a first wireless carrier, and the second transceiver is a portion of a RAN associated with a second wireless carrier, in some implementations, the UE can provide information about the UE to the second transceiver, such as the International Mobile Equipment Identity (IMEI), the media access control (MAC) identifier, and so on. Such information can allow the second wireless carrier to determine whether the UE is authorized to use the second wireless carrier's network. In addition, if the second wireless carrier uses a different wireless technology than the first wireless carrier (e.g., Global System for Mobile Communications (GSM) instead of Code-Division Multiple Access (CDMA) or vice versa), the system can confirm that the UE is compatible with the second transceiver.

In some implementations, the system can determine all UEs that are associated with the first transceiver (e.g., using the techniques of operation 205) and that are in the second cell area (e.g., using the techniques of operation 220), and provide connection instructions (e.g., using the techniques of operation 240) to those UEs to initiate connections with the second transceiver. As compared to waiting for the UEs to discover the outage, performing these operations for all UEs can reduce downtime for UEs that are associated with a transceiver that can no longer provide connectivity.

In some implementations, in response to determining that the second transceiver cannot provide connectivity to all such UEs, the system can determine a subset of the UEs that are associated with the first transceiver and that are in the second cell, and provide connection instructions to those UEs to initiate connections with the second transceiver. For example, the system can compare the average bandwidth required to provide connectivity to a UE to the bandwidth available at the transceiver and use that information to determine the number of UEs that can connect to the second transceiver. Such techniques reduce the likelihood that such UEs will strain the bandwidth of the second transceiver, potentially hindering its ability to provide connectivity to UEs that are associated with the second transceiver.

The system can receive (245) a third control message indicating that the first transceiver is available to provide connectivity. To indicate that it can provide connectivity, the first transceiver can resume transmitting control messages to the system, and the system can receive those control messages.

The system can determine (250) that the first transceiver is available using various techniques. For example, upon receiving a control message, the system can determine that the first transceiver is available. In another example, the system can determine that the first transceiver is available if the system receives a configured number of control messages (e.g., 3, 5, 10, etc.) within a configured period of time (e.g., 30 seconds, 1 minute, 2 minutes, etc.). By requiring receipt of multiple control messages within a configured period, the system reduces the likelihood that the UE will have to continually switch transceivers if the first transceiver is experiencing repeated fault conditions that impair its ability to provide connectivity.

The system can determine (255) that the UE is located within the first cell area. The system can use the techniques of operation 220 or similar techniques.

In response to determining that the UE is within the first cell area, the system can provide (260) instructions to the UE to connect to the first transceiver. The system can use the techniques of operation 240 or similar techniques.

Figure 3:
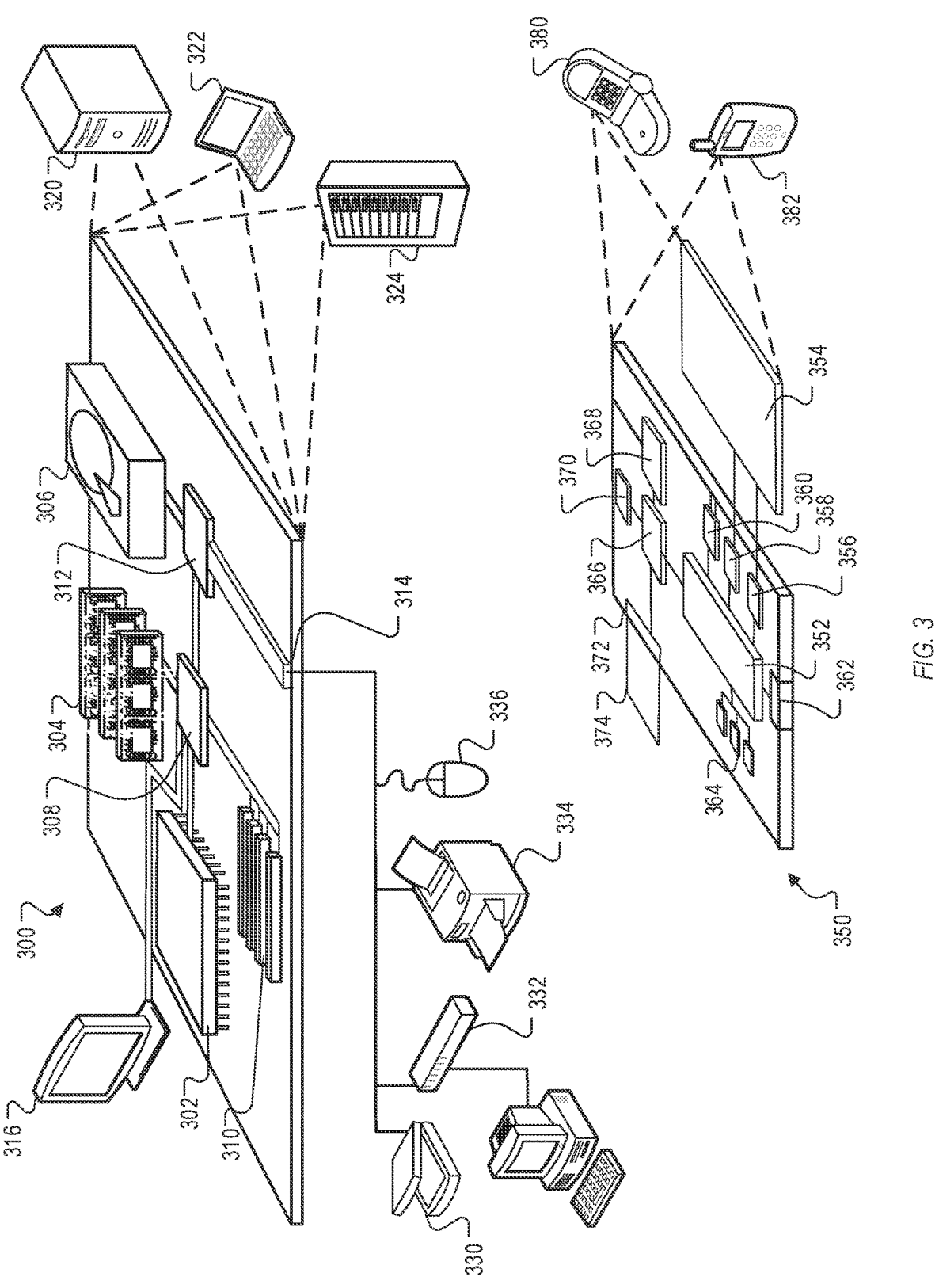
FIG. 3 is a diagram illustrating examples of computing devices that may be used to implement technology described herein.

FIG. 3 is a diagram illustrating examples of computing devices 300, 350 that may be used to implement the technology described herein. FIG. 3 includes a computing device 300 and a mobile computing device 350 that are employed to execute implementations of the present disclosure. The elements of FIG. 1 can be implemented on computing devices that are substantially similar to the devices 300, 350 described in FIG. 3. For example, the network computing device 102 can be a computing device 300 or a substantially similar device, and UE 195 can be a mobile computing device 350 or a substantially similar device. In some cases, UE 195 can be a computing device 300, such as a laptop computer that includes cellular networking capability. In addition, cell site 175 can include one or more computing devices 300.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 300 and/or the mobile computing device 350 can be user devices that form at least a portion of a system that runs one or more software applications to implement the technology described herein. For example, a display 316 of the computing device 300 and/or a display 354 of the mobile computing device 350 can be used to present the user interface of the technology described herein. The computing device 300 and/or the mobile computing device 350 can also be used to perform the process 200 described and shown above in relation to FIG. 2.

The computing device 300 includes a processor 302, a memory 304, a storage device 306, a high-speed interface 308, and a low-speed interface 312. In some implementations, the high-speed interface 308 connects to the memory 304 and multiple high-speed expansion ports 310. In some implementations, the low-speed interface 312 connects to a low-speed expansion port 314 and the storage device 306. Each of the processor 302, the memory 304, the storage device 306, the high-speed interface 308, the high-speed expansion ports 310, and the low-speed interface 312 is interconnected using various buses, and may be mounted on a common motherboard or in other manners as appropriate. The processor 302 can process instructions for execution within the computing device 300, including instructions stored in the memory 304 and/or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of a computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 302, perform one or more methods, such as those described above. The instructions can also be stored by one or more storage devices, such as computer-readable or machine-readable media such as the memory 304, the storage device 306, or memory on the processor 302.

The high-speed interface 308 manages bandwidth-intensive operations for the computing device 300, while the low-speed interface 312 manages less bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In such implementations, the low-speed interface 312 is coupled to the storage device 306 and the low-speed expansion port 314. The low-speed expansion port 314, which may include various communication ports (e.g., Universal Serial Bus (USB), Bluetooth, Ethernet, wireless Ethernet), may be coupled to one or more input/output devices. Such input/output devices may include a scanner, a printing device, or a keyboard or mouse. The input/output devices may also be coupled to the low-speed expansion port 314 through a network adapter. Such network input/output devices may include, for example, a switch or router.

The computing device 300 may be implemented in a number of different forms, as shown in FIG. 3. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 334, an input/output device, such as a display 354, a communication interface 366, a transceiver 338, and other components. The mobile computing device 350 may also be provided with a storage device, such as a micro-drive or other device, to provide additional storage. Each of the processor 352, the memory 334, the display 354, the communication interface 366, and the transceiver 338 is interconnected using various buses, and several of the components may be mounted on a common motherboard or in other manners as appropriate. In some implementations, the mobile computing device 350 may include one or more camera devices.

The processor 352 can execute instructions within the mobile computing device 350, including instructions stored in the memory 334. The processor 352 may be implemented as a chipset of chips that include separate and multiple analog and digital processors. For example, the processor 352 may be a Complex Instruction Set Computers (CISC) processor, a Reduced Instruction Set Computer (RISC) processor, or a Minimal Instruction Set Computer (MISC) processor. The processor 352 may provide, for example, for coordination of the other components of the mobile computing device 350, such as control of user interfaces (UIs), applications run by the mobile computing device 350, and/or wireless communication by the mobile computing device 350.

The processor 352 may communicate with a user through a control interface 358 and a display interface 356 coupled to the display 354. The display 354 may be, for example, a Thin-Film-Transistor Liquid Crystal Display (TFT) display, an Organic Light Emitting Diode (OLED) display, or other appropriate display technology. The display interface 356 may include appropriate circuitry for driving the display 354 to present graphical and other information to a user. The control interface 358 may receive commands from a user and convert them for submission to the processor 352. In addition, an external interface 332 may provide communication with the processor 352, so as to enable short-range communication of the mobile computing device 350 with other devices. The external interface 332 may provide, for example, for wired communication in some implementations, or for wireless communication in other implementations, and multiple interfaces may also be used.

The memory 334 stores information within the mobile computing device 350. The memory 334 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a Single Inline Memory Module (SIMM) card interface. The expansion memory 374 may provide extra storage space for the mobile computing device 350, or may also store applications or other information for the mobile computing device 350. Specifically, the expansion memory 374 may also include instructions to carry out or supplement the processes described above and may also include secure information. Thus, for example, the expansion memory 374 may be provided as a security module for the mobile computing device 350 and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 352, perform one or more methods, such as those described above. The instructions can also be stored by one or more storage devices, such as one or more computer-readable or machine-readable media, such as the memory 334, the expansion memory 374, or memory on the processor 352. In some implementations, the instructions can be received in a propagated signal, such as, over the transceiver 338 or the external interface 332.

The mobile computing device 350 may communicate wirelessly through the communication interface 366, which may include digital signal processing circuitry where necessary. The communication interface 366 may provide for communications under various modes or protocols, such as Global System for Mobile Communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS). Such communication may occur, for example, through the transceiver 338 using a radio frequency. Short-range communication, such as using Bluetooth or Wi-Fi, may also occur. A Global Positioning System (GPS) receiver module 370 may provide additional navigation- and location-related wireless data to the mobile computing device 350, which may be used as appropriate by applications running on the mobile computing device 350.

The mobile computing device 350 may also communicate audibly using an audio codec 330, which may receive spoken information from a user and convert it to usable digital information. The audio codec 330 may likewise generate audible sound for a user, such as through a speaker, e.g., in a handset of the mobile computing device 350. Such sound may include sound from voice telephone calls and recorded sound (e.g., voice messages, music files, etc.) and may also include sound generated by applications operating on the mobile computing device 350.

The mobile computing device 350 may be implemented in a number of different forms, as shown in FIG. 3. Other implementations may include a phone device 380, a personal digital assistant 382, and a tablet device (not shown). The mobile computing device 350 may also be implemented as a component of a smartphone, AR device, or other similar mobile device.

Computing device 300 and/or 350 can also include USB flash drives. The USB flash drives may store operating systems and other applications. The USB flash drives can include input/output components, such as a wireless transmitter or USB connector that may be inserted into a USB port of another computing device.

Embodiments of the subject matter and the actions and operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially generated propagated signal, e.g., a machine-generated electrical, optical, or electromagnetic signal, that is generated to encode information for transmission to a suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. A data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

As used in this specification, the term "engine" or "software engine" refers to a software-implemented input/output system that provides an output that is different from the input. An engine can be an encoded block of functionality, such as a library, a platform, a software development kit ("SDK"), or an object. Each engine can be implemented on any appropriate type of computing device that includes one or more processors and computer-readable media, e.g., servers, mobile phones, tablet computers, notebook computers, music players, e-book readers, laptop or desktop computers, PDAS, smartphones, or other stationary or portable devices. Additionally, two or more of the engines may be implemented on the same computing device, or on different computing devices.

This specification uses the term "configured to" in connection with systems, apparatus, and computer program components. That a system of one or more computers is configured to perform particular operations or actions means that the system has installed on it software, firmware, hardware, or a combination thereof that, in operation causes the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions. Embodiments of the subject matter described in this specification can be implemented in a computing system that includes a back-end component, e.g., as a data server; a middleware component, e.g., an application server; a front-end component, e.g., a client computer having a graphical user interface, a web browser, or an app through which a user can interact with an implementation of the subject matter described in this specification; or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and a server are generally remote from each other and typically interact through a communication network. The relationship of client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

identifying, at a network administration module, that a user equipment (UE) is associated with a first transceiver in a first cell area;

determining, by the network administration module, that a first periodic message has not been received at the network administration module from the first transceiver for a threshold amount of time, the first periodic message including a descriptor of the first transceiver and being indicative of bandwidth availability within the first cell area;

based on the determination that the first periodic message has not been received at the network administration module from the first transceiver for the threshold amount of time, determining, by the network administration module, that the first transceiver is incapable of providing connectivity to the UE;

determining, by the network administration module, that the UE is within a second cell area and that a second transceiver associated with the second cell area is capable of providing connectivity to the UE; and providing, by the network administration module, instructions to the UE to initiate a connection with the second transceiver.

2. The computer-implemented method of claim 1, further comprising:

receiving, at the network administration module from the second transceiver, a second periodic message indicative of bandwidth availability within the second cell area; and responsive to receiving the second periodic message indicative of the bandwidth availability within the second cell area, determining, by the network administration module, that the UE is to be switched from the first transceiver to the second transceiver.

3. The computer-implemented method of claim 2, wherein determining that the UE is to be switched from the first transceiver to the second transceiver further comprises:

determining that the second periodic message has been received within a threshold amount of time.

4. The computer-implemented method of claim 1, further comprising:

receiving, at the network administration module, a third periodic message indicative of bandwidth availability within the first cell area, the third periodic message indicating that the first transceiver is available to provide connectivity;

determining that the UE is located within the first cell area; and in response to determining that the UE is within the first cell area, providing instructions to the UE to connect to the first transceiver.

5. The computer-implemented method of claim 1 wherein the first transceiver is a portion of a radio access network (RAN) associated with a first wireless carrier, and the second transceiver is a portion of a RAN associated with a second wireless carrier.

6. The computer-implemented method of claim 1 wherein the first transceiver and the second transceiver are portions of a radio access network (RAN) associated with a particular wireless carrier.

7. The computer-implemented method of claim 1 wherein the first cell area and the second cell area are partially overlapping and the UE is located in the overlapping area.

8. A system comprising:

one or more computing devices; and one or more storage devices connected to communicate with the one or more computing devices, the one or more storage devices storing instructions that, when executed by the one or more computing devices, cause the system to perform operations comprising:

identifying, at a network administration module implemented using the one or more computing devices, that a user equipment (UE) is associated with a first transceiver in a first cell area, determining, by the network administration module, that a first periodic message has not been received at the network administration module from the first transceiver for a threshold amount of time, the first periodic message including a descriptor of the first transceiver and being indicative of bandwidth availability within the first cell area, based on the determination that the first periodic message has not been received at the network administration module from the first transceiver for the threshold amount of time, determining, by the network administration module, that the first transceiver is incapable of providing connectivity to the UE, determining, by the network administration module, that the UE is within a second cell area and that a second transceiver associated with the second cell area is capable of providing connectivity to the UE, and providing, by the network administration module, instructions to the UE to initiate a connection with the second transceiver.

9. The system of claim 8, the operations further comprising:

receiving, at the network administration module from the second transceiver, a second periodic message indicative of bandwidth availability within the second cell area; and responsive to receiving the second periodic message indicative of bandwidth availability within the second cell area, determining, by the network administration module, that the UE is to be switched from the first transceiver to the second transceiver.

10. The system of claim 9, wherein determining that the UE is to be switched from the first transceiver to the second transceiver further comprises:

determining that the second periodic message has been received within a threshold amount of time.

11. The system of claim 8, the operations further comprising:

receiving, at the network administration module, a third periodic message indicative of bandwidth availability within the first cell area, the third periodic message indicating that the first transceiver is available to provide connectivity;

determining that the UE is located within the first cell area; and in response to determining that the UE is within the first cell area, providing instructions to the UE to connect to the first transceiver.

12. The system of claim 8, wherein the first transceiver is a portion of a radio access network (RAN) associated with a first wireless carrier, and the second transceiver is a portion of a RAN associated with a second wireless carrier.

13. The system of claim 8, wherein the first transceiver and the second transceiver are portions of a radio access network (RAN) associated with a particular wireless carrier.

14. The system of claim 8, wherein the first cell area and the second cell area are partially overlapping and the UE is located in the overlapping area.

15. One or more non-transitory computer-readable storage media storing instructions that, when executed by one or more computers, cause the one or more computers to perform operations comprising:

identifying, at a network administration module, that a user equipment (UE) is associated with a first transceiver in a first cell area;

determining, by the network administration module, that a first periodic message has not been received at the network administration module from the first transceiver for a threshold amount of time, the first periodic message including a descriptor of the first transceiver and being indicative of bandwidth availability within the first cell area;

based on the determination that the first periodic message has not been received at the network administration module from the first transceiver for the threshold amount of time, determining, by the network administration module, that the first transceiver is incapable of providing connectivity to the UE;

determining, by the network administration module, that the UE is within a second cell area and that a second transceiver associated with the second cell area is capable of providing connectivity to the UE; and providing, by the network administration module, instructions to the UE to initiate a connection with the second transceiver.

16. The one or more non-transitory computer-readable storage media of claim 15, the operations further comprising:

receiving, at the network administration module from the second transceiver, a second periodic message indicative of bandwidth availability within the second cell area; and responsive to receiving the second periodic message indicative of bandwidth availability within the second cell area, determining, by the network administration module, that the UE is to be switched from the first transceiver to the second transceiver.

17. The one or more non-transitory computer-readable storage media of claim 16, wherein determining that the UE is to be switched from the first transceiver to the second transceiver further comprises:

determining that the second periodic message has been received within a threshold amount of time.

18. The one or more non-transitory computer-readable storage media of claim 15, the operations further comprising:

receiving, at the network administration module, a third periodic message indicative of bandwidth availability within the first cell area, the third periodic message indicating that the first transceiver is available to provide connectivity;

determining that the UE is located within the first cell area; and in response to determining that the UE is within the first cell area, providing instructions to the UE to connect to the first transceiver.

19. The one or more non-transitory computer-readable storage media of claim 15, wherein the first transceiver is a portion of a radio access network (RAN) associated with a first wireless carrier, and the second transceiver is a portion of a RAN associated with a second wireless carrier.

20. The one or more non-transitory computer-readable storage media of claim 15, wherein the first transceiver and the second transceiver are portions of a radio access network (RAN) associated with a particular wireless carrier.

* * * * *